United States Patent [19]
Oda et al.

[11] Patent Number: 5,820,742
[45] Date of Patent: Oct. 13, 1998

[54] ELECTRODEPOSITION COATING METHOD AND ELECTRODEPOSITION COATING AGENT

[75] Inventors: Shin-i-ti Oda; Toshihide Okamoto; Hiroshi Yokota; Kenjiro Hayashi; Kazufumi Hamabuchi, all of Ibaraki; Toshio Mizuno, Settsu, all of Japan

[73] Assignee: Daikin Industries, Ltd., Osaka, Japan

[21] Appl. No.: 619,670

[22] PCT Filed: Sep. 29, 1994

[86] PCT No.: PCT/JP94/01624

§ 371 Date: May 23, 1996

§ 102(e) Date: May 23, 1996

[87] PCT Pub. No.: WO95/09897

PCT Pub. Date: Apr. 13, 1995

[30] Foreign Application Priority Data

Oct. 1, 1993 [JP] Japan .................................. 5-246863

[51] Int. Cl.$^6$ .......................... C09D 179/08; C09D 5/44; C09D 127/12; C08L 79/08; C08L 27/12

[52] U.S. Cl. .......................... 205/317; 205/159; 205/324; 205/162; 205/322; 205/164; 205/323; 205/414; 205/431; 205/435; 205/440; 205/434; 252/500; 427/487; 427/58; 427/385.5; 427/430.1; 524/600; 528/188; 525/199

[58] Field of Search .......................... 252/500; 524/600; 528/188; 525/199; 424/487, 58, 385.5, 430.1; 205/159, 324, 162, 322, 164, 323, 317, 414, 431, 434, 435, 440

[56] References Cited

U.S. PATENT DOCUMENTS

| | | | |
|---|---|---|---|
| 3,925,313 | 12/1975 | Kojima et al. | 260/47 |
| 4,016,125 | 4/1977 | Vassilliou et al. | 260/29.6 |
| 4,385,084 | 5/1983 | Iwama et al. | 427/244 |
| 4,389,510 | 6/1983 | McGregor et al. | 524/600 |
| 4,442,283 | 4/1984 | Gagliani et al. | 528/323 |
| 4,444,823 | 4/1984 | Galiani et al. | 423/113 |
| 4,478,717 | 10/1984 | Kurihara | 210/500.2 |
| 4,600,770 | 7/1986 | Gagliani et al. | 528/322 |
| 4,658,010 | 4/1987 | Long et al. | 528/322 |
| 4,759,987 | 7/1988 | Mizobe et al. | 428/395 |
| 4,833,272 | 5/1989 | Nakazawa et al. | 562/523 |
| 5,248,396 | 9/1993 | Casanova et al. | 204/59 R |
| 5,252,700 | 10/1993 | Okikawa et al. | 526/353 |
| 5,270,438 | 12/1993 | Yusa et al. | 528/353 |
| 5,312,866 | 5/1994 | Tsutsumi et al. | 524/600 |
| 5,424,165 | 6/1995 | Sekiya | 430/157 |
| 5,504,128 | 4/1996 | Mizutani et al. | 524/104 |
| 5,580,918 | 12/1996 | Morita et al. | 524/413 |
| 5,665,856 | 9/1997 | Nihira et al. | 528/353 |
| 5,686,558 | 11/1997 | Kitamura et al. | 528/353 |
| 5,731,405 | 3/1998 | Gibbons et al. | 526/353 |

FOREIGN PATENT DOCUMENTS

| | | |
|---|---|---|
| 49-10541 | 1/1974 | Japan . |
| 51-538 | 1/1976 | Japan . |
| 63-286480 | 11/1988 | Japan . |
| 63-291966 | 11/1988 | Japan . |

*Primary Examiner*—Douglas J. McGinty
*Attorney, Agent, or Firm*—Varndell Legal Group

[57] ABSTRACT

An electrodeposition coating method characterized in that in electrodeposition coating of a water soluble composition of a polyimide precursor which is prepared by using 1,2,3,4-butanetetracarboxylic acid or its imide-forming derivative and a diamine and has a percentage of residual acid value of 30 to 3%, there is added previously a water soluble solvent selected from the group consisting of an alcoholic solvent, N-methyl-2-pyrrolidone, dimethylformamide and dimethylacetamide to the above-mentioned composition, and an electrodeposition coating agent used therefor. There can be provided the electrodeposition coating method practicable for the use of a water soluble polyimide composition which is capable of forming a uniform baked coating film having a continuous surface and being excellent in adhesivity to substrate and in toughness.

19 Claims, 1 Drawing Sheet

ELECTRODEPOSITION COATING METHOD AND ELECTRODEPOSITION COATING AGENT

TECHNICAL FIELD

The present invention relates to an electrodeposition coating method of a water soluble polyimide composition and an electrodeposition coating agent comprising a water soluble polyimide composition.

BACKGROUND OF THE INVENTION

A polyimide composition is used in various fields, such as for a coating agent, adhesive, sealant and fiber for the reason of being excellent in thermal resistance, chemical stability and electrical property, and a large commercial success has been obtained. Particularly, there are many cases where the polyimide composition is used for coating by utilizing its excellent film forming property, and in general the coating has been carried out through spray coating and dip coating methods. In case of spray coating, there are problems such that an adhesion efficiency is lowered by about 30% as compared with other coating methods and unevenness of the coating is easy to occur. In case of dip coating, there are problems such that cracks of the coating occur on the thickened parts and that sharp-pointed portions (edge, end of pin) are difficult to be coated.

Electrodeposition coating method is an effective method to solve the above-mentioned problems. As a method to use a polyimide composition for electrodeposition coating, there can be considered a method to use, as a water soluble composition, a polyamic acid which is a polyimide precursor and is prepared usually by using an aromatic tetracarboxylic acid such as pyromellitic acid anhydride and a diamine. However particularly in case of solubilizing the aromatic polyimide precursor in water through the polymerization reaction, it is difficult to increase a molecular weight due to imidation reaction. Therefore the baked film has neither strength nor elongation and thus suffers damage easily.

Also though there are examples of electro-deposition coating of a polyimide polymer in some literatures and patent specifications, present situation is such that those coating methods have not yet reached practicable level because, even if electrodeposition is successfully carried out, a film cannot be obtained after baking, or has problems in continuity, flexibility and thermal resistance.

The present inventors have made intensive studies to solve the above-mentioned problems, and as a result, have found that to make it possible to enhance physical properties of the coating film of a water soluble polyimide in electrodeposition coating much more than that of the conventional coating methods and to enhance stability of an aqueous solution, it is preferable to use a composition in which a polyamic acid is prepared by using 1,2,3,4-butanetetracarboxylic acid or its imide-forming derivative and a nearly equivalent mole of diamine and neutralized with ammonia or the like to be water-solubilized. However though the thus prepared polyamic acid can be used for electrodeposition coating, there are drawbacks such that, after baking, the baked coating becomes in the form of mottle or spot, thus the baked film cannot be continuous, and is lacking in uniformity, adhesivity to a substrate and toughness.

The present invention can provide an electrodeposition coating method of a water soluble polyimide composition free of the above-mentioned drawbacks and an electrodeposition coating agent comprising a water soluble polyimide. Therefore objects of the present invention are to provide an electrodeposition coating method being practicably useful for a water soluble polyimide composition which makes it possible to obtain a continuous coating film and form a uniform baked film being excellent in adhesivity to a substrate and toughness, and to provide an electrodeposition coating agent.

DISCLOSURE OF THE INVENTION (1) An electrodeposition coating method, characterized in that in electrodeposition coating of a water soluble composition of a polyimide precursor which is obtained from 1,2,3,4-butanetetracarboxylic acid or its imide-forming derivative and a diamine and has a percentage of residual acid value of 30 to 3%, there is added previously a water soluble solvent selected from the group consisting of an alcoholic solvent, N-methyl-2-pyrrolidone, dimethylformamide and dimethylacetamide to the water soluble composition.

(2) The electrodeposition coating method described in the above (1), in which a content of the water soluble solvent selected from the group consisting of an alcoholic solvent, N-methyl-2-pyrrolidone, dimethylformamide and dimethylacetamide is not less than 20% by weight on the basis of the sum of the water soluble composition of the polyimide precursor and the water soluble solvent.

(3) The electrodeposition coating method described in the above (1), in which a dispersion containing a fluorine-containing resin is added to the water soluble composition of the polyimide precursor.

(4) The electrodeposition coating method described in the above (3), in which a solid weight ratio of the water soluble composition of the polyimide precursor to the dispersion containing the fluorine-containing resin is 5:95 to 95:5.

(5) The electrodeposition coating method described in the above (3), in which the dispersion containing the fluorine-containing resin is a dispersion of polytetrafluoroethylene.

(6) An electrodeposition coating method, characterized in that a water soluble composition of a polyimide precursor which is obtained from 1,2,3,4-butanetetracarboxylic acid or its imide-forming derivative and a diamine and has a percentage of residual acid value of 30 to 3%, is used for electrodeposition-coating and then a water soluble solvent selected from the group consisting of an alcoholic solvent, N-methyl-2-pyrrolidone, dimethylformamide and dimethylacetamide or its aqueous solution is applied to the electrodeposition-coated surface.

(7) The electrodeposition coating method described in the above (6), in which a dispersion containing a fluorine-containing resin is added to the water soluble composition of the polyimide precursor.

(8) The electrodeposition coating method described in the above (7), in which a solid weight ratio of the water soluble composition of the polyimide precursor to the dispersion containing the fluorine-containing resin is 5:95 to 95:5.

(9) The electrodeposition coating method described in the above (7), in which the dispersion containing the fluorine-containing resin is a dispersion of polytetrafluoroethylene.

(10) An electrodeposition coating agent prepared by adding a water soluble solvent selected from the group consisting of an alcoholic solvent, N-methyl-2-pyrrolidone, dimethylformamide and dimethylacetamide to a water soluble composition of a polyimide precursor which is prepared by using 1,2,3,4-butanetetracarboxylic acid or its imide-forming derivative and a diamine and has a percentage of residual acid value of 30 to 3%, and a content of the above-mentioned water soluble solvent is not less than 20% by weight on the basis of the sum of the water soluble solvent and the water soluble composition of the polyimide precursor.

(11) The electrodeposition coating agent described in the above (10), wherein a dispersion containing a fluorine-containing resin is added to the water soluble composition of the polyimide precursor.

(12) The electrodeposition coating agent described in the above (11), in which a solid weight ratio of the water soluble composition of the polyimide precursor to the dispersion containing the fluorine-containing resin is 5:95 to 95:5.

(13) The electrodeposition coating agent described in the above (11), in which the dispersion containing the fluorine-containing resin is a dispersion of polytetrafluoroethylene.

BEST MODE FOR CARRYING OUT THE INVENTION

Figure 1:
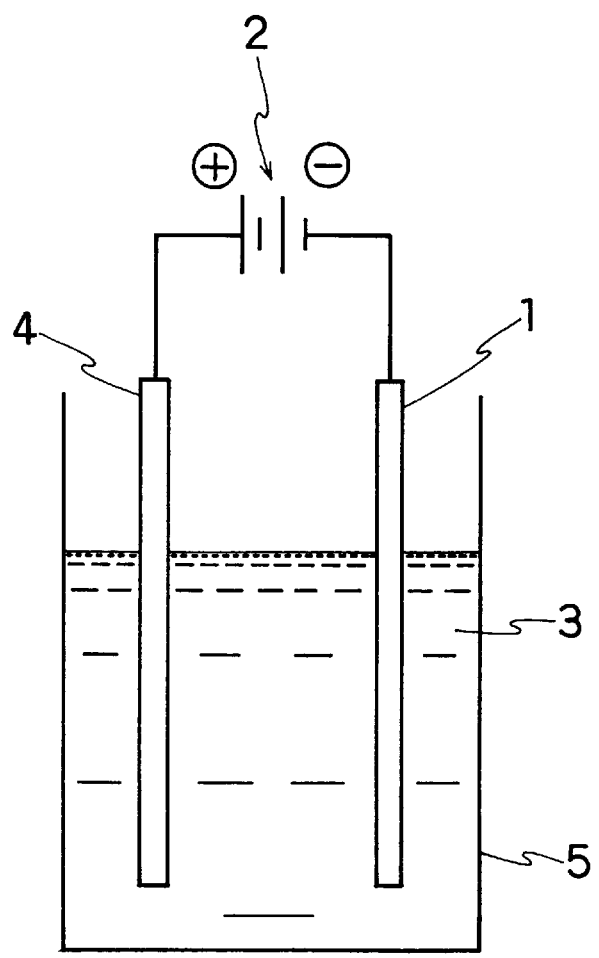
FIG. 1 is a conceptual view showing one example of the apparatus to be used in the electrodeposition coating method of the present invention.

The present invention is explained below further in detail.

The water soluble composition of the polyimide precursor which is a main component of the polyimide composition for electrodeposition coating of the present invention is preferably prepared by heating 1,2,3,4-butanetetracarboxylic acid or, if occasion demands, its imide-forming derivative (monoanhydride, dianhydride, ester, amide or the like) and a diamine in the water soluble solvent or if occasion demands, in coexistence of the water soluble solvent and water, and proceeding with the reaction (amidation and imidation) to form a polyimide precursor having a percentage of residual acid value of 30 to 3%, and then adding, for example, ammonia to the obtained polyimide precursor to give the water soluble composition.

As the diamine, there can be properly used an aliphatic diamine, an alicyclic diamine, an aromatic diamine and a mixture thereof. Particularly practicable s an aromatic diamine. Examples of the diamine are those as exemplified below, but are not limited to them; methaphenylenediamine, paraphenylenediamine, 4,4'-diaminodiphenylmethane, 4,4'-diaminodiphenylethane, 4,4'-diaminodiphenylpropane, 4,4'-diaminodiphenylether, 3,4'-diaminodiphenylether, benzidine, 3,3'-dimethoxybenzidine, 4,4'-diaminodiphenyl sulfite, 4,4'-diaminodiphenylsulfone, 3,3'-diaminodiphenylsulfone, p-bis(4-aminophenoxy)benzene, m-bis(4-aminophenoxy)benzene, 4,4'-diaminobiphenyl, m-xylylenediamine, p-xylylenediamine, hexamethylenediamine, heptamethylenediamine, nonamethylenediamine, 4,4'-dimethylheptamethylenediamine, 3-methoxyheptamethylenediamine, 2,11-diaminododecane, 1,4-diaminocyclohexane, 2,2'-diaminodiethylether, 2,2'-diaminodiethylthioether, 3,3'-diaminodipropoxyethane, 2,6-diaminopyridine, guanamine, 2,5-diamino-1,3,4-oxadiazole, 2-(3'-aminophenyl)-5-aminobenzoxazole, bis-(4-aminophenyl)phosphine oxide, bis-(4-aminophenyl)diethylsilane and the like. Those diamine compounds can be used alone or in a mixture thereof.

As the water soluble solvent to be used in the present invention, there can be used N-methyl-2-pyrrolidone, dimethylformamide, dimethylacetamide or an alcoholic solvent represented by the following formula. Those solvents may be used alone or in a mixture thereof.

R—OH            (I)

R is a monovalent residual group of an aliphatic or alicyclic compound having 3 to 8 carbon atoms).

HO—R$^1$—OH            (II)

R$^1$ is a divalent residual group of an aliphatic or alicyclic compound having 3 to 8 carbon atoms or a divalent residual group represented by the formula:

$$-(\text{CHCH}_2\text{O})_n-\text{CHCH}_2-$$ with R$^2$ substituents (III)

"n is 0 or an integer of 1 to 5, R$^2$ is hydrogen or methyl").

R$^3$O—(CH$_2$CH$_2$O)$_m$—R$^4$            (IV)

(m is an integer of 1 to 3, R$^3$ is a lower alkyl group having 1 to 4 carbon atoms, R$^4$ is hydrogen or —OOCCH$_3$ or both R$^3$ and R$^4$ are methyl).

$$R^5 {\Big\langle} \begin{array}{l} \text{OH} \\ \text{OH} \\ \text{OH} \end{array}$$ (V)

(R$^5$ is a residual group of glycerin or trimethylol propane.)

Examples of the water soluble solvent represented by the above-mentioned formula (I) are, for instance, isopropyl alcohol, n-butyl alcohol, t-butyl alcohol, hexyl alcohol, cyclohexyl alcohol and the like.

Examples of the compound represented by the above-mentioned formula (II) are, for instance, ethylene glycol, diethylene glycol, triethylene glycol, tetraethylene glycol, low molecular weight polyethylene glycol, propylene glycol, dipropylene glycol, 1,4-butanediol, 1,6-hexanediol, 1,4-cyclohexanediol and the like.

Examples of the compound represented by the above-mentioned formula (IV) are, for instance, ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, ethylene glycol dimethyl ether, diethylene glycol dimethyl ether, ethylene glycol monoethyl ether acetate, diethylene glycol monomethyl ether acetate and the like.

Examples of the compound represented by the above-mentioned formula (V) are glycerin and trimethylol propane.

The above-mentioned reactive components are poured into a polymerization tank and are reacted. In the polymerization system, preferable total concentration of 1,2,3,4-butanetetracarboxylic acid or its derivative and the diamine in the water soluble solvent or in coexistence of the water soluble solvent and water is usually from 50 to 95% by weight. When more than 95% by weight, it becomes difficult to control the polymerization, and when less than 50% by weight, it is disadvantageous from the viewpoint of preparation cost.

In the reaction, the water soluble solvent can be used solely, and further when using together with water at the initial stage of the reaction, there is a case where the use of the water soluble solvent and water is very advantageous from the viewpoint of polymerization operation. This water is discharged outside the reaction system as heating, and so the reaction system can be maintained homogeneous from the initial stage of the reaction.

Such a reaction method as above is used in case that the reaction is proceeded by using an acid component substantially as a free acid. On the contrary in case where the reaction should be proceeded by using an acid anhydride as an anhydride, it is not preferable to use water as a co-solvent at the time of the reaction.

The molar ratio of butanetetracarboxylic acid to diamine is nearly 1:1, and even in case where an amount of any one of the components is larger by several % by mole, the desired characteristics can be obtained. The reaction temperature is usually not less than 60° C. and up to a boiling point of the solvent under normal pressure, preferably from 80° C. to the boiling point of the solvent.

Under the above-mentioned reaction conditions, there occurs condensation, and a condensate having a percentage of residual acid value of 30 to 3% can be obtained. The acid value is hereinbelow represented by the mg equivalent of carboxyl group per 1 g of sample. Also the percentage of residual acid value referred to herein indicates a residual amount of acid groups after the reaction when the acid value of the acid components in the system at the initial stage of the reaction is defined as 100%. In order to obtain 3 to 30% of the percentage of residual acid value, the percentage of residual acid value may be properly measured during the polymerization, and the polymerization may be stopped when the percentage has reached 3 to 30%. With the percentage of residual acid value being 3 to 30%, there can be obtained a polyimide precursor having both flexibility and thermal resistance. When less than 3%, water solubilization becomes difficult. When more than 30%, though water solubilization is easy, mechanical properties are lowered, and when the obtained composition is applied to a desired use and heated, an amount of releasing components such as water increases and foaming occurs in a coating film due to dehydration, thus impairing an external appearance of the film.

There are adopted various methods to obtain the water soluble composition from the thus obtained polyimide precursor. It is usually preferable to allow the remaining carboxylic acid groups to react with ammonia to give an ammonium salt. As ammonia for forming the ammonium salt, there are used ammonia gas and aqueous ammonia. It is usually easy to add ammonia in diluting water which is used when diluting the composition depending on purposes. It is desirable that the amount of ammonia is nearly an equivalent amount to the acid value of the obtained polyimide precursor, but there is no particular upper limit. Even in that case, if an excess amount is used, it is not economical and an amount of ammonia to be released increases. A temperature for forming the salt from the polyimide precursor may be from 0° to 200° C., preferably from 40° to 120° C. Thus the water soluble composition can be easily obtained.

Water soluble additives may be added, if necessary, to those water soluble compositions, which makes it possible to enhance characteristics of the coating film.

As such water soluble additives, there are phenols, melamines, aldehydes, water soluble titanium compounds, water soluble zirconium compounds and the like. Their amount to be added is usually up to 10% by weight, preferably from 0.1 to 5% by weight on the basis of the whole of the composition.

Also as a curing accelerator, there can be used an organometal salt such as an octenoic acid salt or froic acid salt of, for example, Sn, Zn, Mn, Fe, Co or Pb, in an amount of from 0.01 to 0.1% by weight on the basis of the whole of the composition.

In applying the water soluble composition of the water soluble polyimide precursor obtained as mentioned above to electrodeposition coating, the method of the present invention is characterized in that there is used an electrodeposition coating agent prepared by adding, to the above-mentioned water soluble composition, the water soluble solvent selected from the group consisting of the above-mentioned alcoholic solvent, N-methyl-2-pyrrolidone, dimethylformamide and dimethylacetamide.

The electrodeposition coating operation can be conducted according to known methods, and coating conditions may be suitably selected depending on purpose, use, kind of materials and others and are not specifically limited. As shown, for instance, in FIG. 1 as one example, the electrodeposition coating can be carried out by pouring a solution 3 for electrodeposition coating into a proper vessel 5, by applying electric voltage of 30 to 300 V and current of 1 to 5 A from a direct power source 2 between an anode 4 such as an aluminum sheet and a cathode 1 such as a stainless sheet (SUS 304 in this case).

The thus obtained electrodeposition-coated product is subjected to baking usually at 200° to 400° C. for 5 to 60 minutes.

According to the method of the present invention, a uniform coating can be formed on articles having complicated shape or sharp-pointed portion (for example, edge portion and end of a pin), for instance, thread ridges of bolts and nuts and the like.

In carrying out the electrodeposition coating, the amount of the above-mentioned water soluble solvent to be added to the water soluble polyimide precursor is preferably not less than 20% by weight on the basis of the total amount of both, and the upper limit is not particularly limited, but is 95% by weight from economical point of view. Particularly preferable is 25 to 90% by weight. By adding the water soluble solvent particularly in the above range, improvements of the baked coating can be made more preferably to obtain continuous film, good adhesivity to substrate, toughness and the like.

The before-mentioned object of the present invention can be also achieved by electrodeposition coating with the water soluble composition of the polyimide precursor which is prepared by using 1,2,3,4-butanetetracarboxylic acid or its imide-forming derivative and the diamine and has a percentage of residual acid value of 30 to 3%, and then by applying thereon the water soluble solvent selected from the group consisting of the above-mentioned alcoholic solvent, N-methyl-2-pyrrolidone, dimethylformamide and dimethylacetamide or its aqueous solution.

Namely, the above-mentioned water soluble polyimide precursor composition is first used for electrodeposition coating and, prior to baking, onto the surface of the obtained electrodeposition-coated article is applied the above-mentioned water soluble solvent or its aqueous solution through a suitable coating method such as spray coating or dip coating, followed by curing through baking. Thus a continuous polyimide film which is excellent in flexibility and adhesivity can be formed. In case that the above-mentioned water soluble solvent is used in the form of an aqueous solution, its concentration is not less than 50% by weight, preferably from 75 to 99% by weight. The conditions for curing by baking may be the same as mentioned above.

As the water soluble solvent to be applied before the baking, there is particularly preferably used a water soluble solvent having a boiling point of not less than 200° C. such as diethylene glycol, triethylene glycol, tetraethylene glycol, glycerin or N-methyl-2-pyrrolidone, because a continuous polyimide coating excellent in flexibility and adhesivity can be easily formed in bake-curing.

In the above-explained electrodeposition coating agent and electrodeposition coating method, it is preferable to use the water soluble composition of the polyimide precursor to which a dispersion containing a fluorine-containing resin is added. This addition can further enhance uniform adhesivity of the coating to edge portion having sharp edge, and also enhance thermal resistance. Moreover it is possible to form a coating which has non-tackifying property, a low friction coefficient (lubricity) and excellent chemical resistance such as rust inhibiting property and corrosion protecting property.

The dispersion containing the fluorine-containing resin is an aqueous suspension of fluorine-containing resin particles in the form of hydrophobic colloid.

As the fluorine-containing resin, there can be used various fluorine-containing polymers, particularly homopolymers such as polytetrafluoroethylene and poly(vinylidene fluoride) and copolymers such as tetrafluoroethylene-hexafluoropropylene copolymer, ethylene-tetrafluoroethylene-hexafluoropropylene copolymer, ethylene-tetrafluoroethylene copolymer, ethylene-chlorotrifluoroethylene copolymer and the like, a modified polymer prepared by modifying polytetrafluoroethylene with chlorotrifluoroethylene or perfluoroalkyl vinyl ether, and a mixture thereof.

The modification referred to herein means that insufficient properties are improved by copolymerization in an amount of not more than about 2% by weight on the basis of the whole particles with the inherent useful coefficient being maintained as they are.

Among the above-mentioned fluorine-containing resins being contained in the dispersion, particularly polytetrafluoroethylene is one of the most preferable resins, because the dispersion containing it is readily available and there can be formed a coating being further excellent in thermal resistance and having a low friction coefficient (lubricity).

Those fluorine-containing resins can be obtained as an aqueous suspension containing them usually in an amount of about 30% to about 70% by weight.

A solid weight ratio of the water soluble composition of the polyimide precursor to the dispersion containing the fluorine-containing resin is preferably 5:95 to 95:5, more preferably 40:60 to 60:40. When the content of the polyimide precursor becomes extremely small, there is a fear that toughness of coating is lowered, and when the content of the fluorine-containing resin component becomes too small, there is a case where the above-mentioned effect of improvement by adding the dispersion containing the fluorine-containing resin cannot be exhibited sufficiently. Thus it is preferable to use the water soluble composition and the dispersion in the above-mentioned weight ratio.

The above-mentioned aqueous suspension containing the fluorine-containing resin usually contains a surfactant as a suspension stabilizing agent. In addition, there can be added an inorganic filler, pigment and the like if necessary.

Functions of the present invention are as mentioned below:

(1) The first one of the present invention relates to an electrodeposition coating method in which in electrodeposition coating of a water soluble polyimide composition of a polyimide precursor which is obtained from 1,2,3,4-butanetetracarboxylic acid or its imide-forming derivative and a diamine and has a percentage of residual acid value of 30 to 3%, there is previously added a water soluble solvent selected from the group consisting of an alcoholic solvent, N-methyl-2-pyrrolidone, dimethylformamide and dimethylacetamide to the above-mentioned water soluble composition. According to the method, since the obtained composition is water soluble, it becomes possible to carry out the electrodeposition coating, and also since the above-mentioned specific solvent functions like a plasticizer, it is possible to obtain a continuous coating film and to form a uniform baked coating film excellent in adhesivity to substrate and in toughness. Thus, there can be provided a practicably applicable electrodeposition coating method.

(2) In the electrodeposition coating method of the above (1), when employing a preferred embodiment wherein the content of the water soluble solvent selected from the group consisting of an alcoholic solvent, N-methyl-2-pyrrolidone, dimethylformamide and dimethylacetamide is not less than 20% by weight on the basis of the sum of the water soluble composition of the polyimide precursor and the water soluble solvent, there can be provided a practicably applicable electrodeposition coating method by using the water soluble polyimide composition. According to the method, it is possible to achieve a continuous coated film more easily and to form a uniform baked coating film excellent in adhesivity to substrate and in toughness.

(3) Also in the electrodeposition coating method of the above (1), by adding a dispersion containing a fluorine-containing resin to the water soluble composition of the polyimide precursor, there can be provided an electrodeposition coating method, wherein a more uniform coating film can be formed on a sharp-pointed edge portion of an article to be coated without making a coating film thickness thinner, and also the coating film can be excellent in thermal resistance, non-tackifying property, and chemical resistance such as rust inhibiting property and corrosion protecting property and have a low friction coefficient (lubricity).

(4) In the electrodeposition coating method of the above (3), the above-mentioned functions can be exhibited sufficiently without lowering toughness of the coating film by taking a solid weight ratio of the water soluble composition of the polyimide precursor to the dispersion containing the fluorine-containing resin as 5:95 to 95:5, more preferably 40:60 to 60:40.

(5) There can be provided an electrodeposition coating method, wherein by using a dispersion containing polytetrafluoroethylene as the dispersion of the above (3) containing the fluorine-containing resin, it becomes possible to easily obtain a dispersion containing a fluorine-containing resin, and also by using such dispersion, it is possible to form a coating film being further excellent in thermal resistance and having a low friction coefficient (lubricity).

(6) The present invention relates to an electrodeposition coating method, wherein after electrodeposition coating of a water soluble composition of a polyimide precursor which is obtained from 1,2,3,4-butanetetracarboxylic acid or its imide-forming derivative and a diamine and has a percentage of residual acid value of 30 to 3%, on the electrodeposition-coated surface is coated a water soluble solvent selected from an alcoholic solvent, N-methyl-2-pyrrolidone, dimethylformamide and dimethylacetamide or its aqueous solution. According to the method, since the above-mentioned specific water soluble solvent permeates the coating of the electrodeposition-coated surface and functions like a plasticizer, it is possible to obtain a continuous coating film and to form a uniform baked coating film being excellent in adhesivity to substrate and in toughness.

(7) Also in the electrodeposition coating method of the above (6), by adding a dispersion containing a fluorine-containing resin to the water soluble composition of the polyimide precursor, there can be provided an electrodeposition coating method, wherein a more uniform coating film can be formed on a sharp-pointed edge portion of an article to be coated without making a coating film thickness thinner, and also the coating film can be excellent in thermal resistance, non-tackifying property, and chemical resistance such as rust inhibiting property and corrosion protecting property and have a low friction coefficient (lubricity).

(8) In the electrodeposition coating method of the above (7), the above-mentioned functions can be exhibited sufficiently without lowering toughness of the coating film by taking a solid weight ratio of the water soluble composition of the polyimide precursor to the dispersion containing the fluorine-containing resin as 5:95 to 95:5, more preferably 40:60 to 60:40.

(9) There can be provided an electrodeposition coating method, wherein by using a dispersion containing polytetrafluoroethylene as the dispersion of the above (7) containing the fluorine-containing resin, it becomes possible to easily obtain a dispersion containing a fluorine-containing resin, and also by using such dispersion, it is possible to form a coating film being further excellent in thermal resistance and having a low friction coefficient (lubricity).

(10) The present invention relates to an electrodeposition coating agent which is prepared by adding a water soluble solvent selected from the group consisting of an alcoholic solvent, N-methyl-2-pyrrolidone, dimethylformamide and dimethylacetamide to a water soluble composition of a polyimide precursor which is obtained from 1,2,3,4-butanetetracarboxylic acid or its imide-forming derivative and a diamine and has a percentage of residual acid value of 30 to 3%, and since a content of the above-mentioned water soluble solvent is taken as not less than 20% by weight on the basis of the sum of the water soluble solvent and the water soluble composition of the polyimide precursor, it is possible to carry out the electrodeposition coating, and also since at electrodeposition coating, the above-mentioned specific solvent functions like a plasticizer, it is possible to obtain a continuous coating film and to form a uniform baked coating film excellent in adhesivity to substrate and in toughness. Thus there can be provided a practicably applicable electrodeposition coating agent.

(11) Also by adding a dispersion containing a fluorine-containing resin to the water soluble composition of the polyimide precursor of the above (10), there can be obtained an electrodeposition coating agent which makes it possible to form a more uniform coating film on a sharp-pointed edge portion of an article to be coated without making a coating film thickness thinner, and also to obtain a coating film being excellent in thermal resistance, non-tackifying property, and chemical resistance such as rust inhibiting property and corrosion protecting property and having a low friction coefficient (lubricity).

(12) In the electrodeposition coating agent of the above (11), there can be obtained an electrodeposition coating agent which can exhibit the above-mentioned functions sufficiently without lowering toughness of a coating film by taking a solid weight ratio of the water soluble composition of the polyimide precursor to the dispersion containing the fluorine-containing resin as 5:95 to 95:5, more preferably 40:60 to 60:40.

(13) There can be provided an electrodeposition coating agent, wherein by using a dispersion containing polytetrafluoroethylene as the dispersion of the above (11) containing the fluorine-containing resin, it becomes possible to easily obtain a dispersion containing a fluorine-containing resin, and also, by using such dispersion, it is possible to form a coating film being further excellent in thermal resistance and having a low friction coefficient (lubricity).

EXAMPLE 1

A 500 cc three-necked flask equipped with a thermoregulator, condenser and stirrer was charged with 117.0 g (0.5 mole) of 1,2,3,4-butanetetracarboxylic acid, 99.0 g (0.5 mole) of 4,4-diaminodiphenylmethane and 70.0 g of triethylene glycol, and they were mixed with stirring to initiate the synthesis. When the temperature of the mixture reached about 100° C., water began to be distilled and the mixture became a homogeneous brown solution gradually. When the temperature reached 130° C., water distilled from the reaction mixture was 14 mml, and an acid value of the obtained polyimide precursor was 1.54 mg (percentage of residual acid value:22.0%). At that point, the reaction was terminated. Then, aqueous ammonia prepared by diluting aqueous ammonia (28%) with purified water in an amount of 1.5 times larger was added, and excess ammonia was distilled off from the reaction system. At the final stage of the reaction, smell of ammonia could not be observed from the solution. Subsequently 480 g of triethylene glycol was added to the solution, followed by stirring at 50° C. for 30 minutes to give a composition for electrodeposition. A viscosity of the obtained water soluble composition for electrodeposition, which was measured with the model B viscometer in the manner described in JIS K 6893-(1976) (hereinafter the same), was 1.7 poises (measured at 30° C.), and a solid content was 22.1%.

The electrodeposition coating was carried out by using an apparatus shown in FIG. 1. By using a 2 cm× 10 cm stainless sheet (SUS 304) as a cathode 1 in FIG. 1 and a 2 cm×10 cm aluminum sheet as an anode 4, the electrodeposition coating was carried out for 60 seconds at 150 V with a direct power source 2 (maximum electric current at that time was 1.3 A). As a solution 3 for electrodeposition coating in FIG. 1, there was used the water soluble composition of the EXAMPLE 1. The coated aluminum sheet was dried at 120° C. for 30 minutes, and then baked at 250° C. for 60 minutes. The surface of the baked aluminum sheet was smooth, and there was found no pin hole. The coated surface was cut to 100 squares of 1 cm×1 cm to carry out cross cut test (JIS K 5400). There was no peeling and adhesivity of the coating was very excellent.

EXAMPLE 2

A polyimide precursor was synthesized in the same manner as in EXAMPLE 1 by using 117.0 g (0.5 mole) of 1,2,3,4-butanetetracarboxylic acid, 58.0 g (0.5 mole) of hexamethylenediamine and 35.0 g of ethylene glycol monoethyl ether. An acid value of the obtained polyimide precursor was 2.23 mg (percentage of residual acid value: 23.4%).

Subsequently aqueous ammonia and purified water were added to form an ammonium salt, and then 100 g of N-methyl-2-pyrrolidone was added to give a composition for electrodeposition coating, which has a viscosity of 1.1 poises and a solid content of 24.2%. The electrodeposition coating was carried out at 150 V (maximum electric current at that time was 1.0 A) for 60 seconds by using the same apparatus as in FIG. 1. Baking was carried out in the same manner as in EXAMPLE 1.

The obtained coating film was smooth and free of pin hole. There was found no peeling in the cross cut test, and the results of the test were good.

COMPARATIVE EXAMPLE 1

A polyimide precursor having an acid value of 1.54 mg (percentage of residual acid value:22.0%) was synthesized in the same manner as in EXAMPLE 1 by using 117.0 g (0.5 mole) of 1,2,3,4-butanetetracarboxylic acid, 99.0 g (0.5 mole) of 4,4'-diaminodiphenylmethane and 70.0 g of triethylene glycol, and aqueous ammonia was added in the same manner as in EXAMPLE 1 to form an ammonium salt. Then 480 g of water was added, and the solution was stirred at 50° C. for 30 minutes to give a composition for electrodeposition coating. A viscosity of the obtained composition was 0.8 poise (measured at 30° C.), and a solid content was 22.0%.

The electrodeposition coating was carried out at 150 V (maximum electric current at that time was 1.5 A ) for 60 seconds by using the same apparatus as in FIG. 1, and there was observed formation of polyimide film on the aluminum sheet. Subsequently after baking in the same manner as in EXAMPLE 1, the surface of the coating film was in the granular form as if it was covered with sands, and there was almost no continuous surface. The coated film in the granular form was peeled off easily when scrubbed lightly with a nail.

EXAMPLE 3

A 500 cc three-necked flask equipped with a thermoregulator, condenser and stirrer was charged with 117.0 g (0.5 mole) of 1,2,3,4-butanetetracarboxylic acid, 99.0 g (0.5 mole) of 4,4'-diaminodiphenylmethane and 70.0 g of triethylene glycol, and they were mixed with stirring to initiate the synthesis. When the temperature of the mixture reached about 100° C., water began to be distilled and the mixture became a homogeneous brown solution gradually. When the temperature reached 130° C., water distilled from the reaction mixture was 14 mml, and an acid value of the obtained polyimide precursor was 1.54 mg (percentage of residual acid value:22.0%). At that point, the reaction was terminated. Then, aqueous ammonia prepared by diluting aqueous ammonia (28%) with purified water in an amount of 1.5 times larger was added, and excess ammonia was distilled off from the reaction system. At the final stage of the reaction, smell of ammonia could not be observed from the solution. Further 480 g of water was added to the solution, followed by stirring at 50° C. for 30 minutes to give a composition for electrodeposition coating. A viscosity of the obtained water soluble composition for electrodeposition was 1.7 poises (measured at 30° C.), and a solid content was 22.0%.

The electrodeposition coating was carried out in the same manner as in EXAMPLE 1. The obtained coated article was dipped in triethylene glycol for a short period of time, dried at 120° C. for 30 minutes, and then baked at 250° C. for 60 minutes. The surface of the baked coating was smooth, and there was no pin hole. The coated surface was cut to 100 squares of 1 cm×1 cm to carry out the cross cut test. There was no peeling and adhesivity of the coating was very good.

EXAMPLE 4

A polyimide precursor was synthesized in the same manner as in EXAMPLE 3 by using 117.0 g (0.5 mole) of 1,2,3,4-butanetetracarboxylic acid, 58.0 g (0.5 mole) of hexamethylenediamine and 35.0 g of ethylene glycol monoethyl ether. An acid value of the obtained polyimide precursor was 2.23 mg (percentage of residual acid value: 23.4%).

Subsequently aqueous ammonia and purified water were added to form an ammonium salt, and then 100 g of water was added to give a composition for electrodeposition coating. A viscosity of the obtained composition was 0.5 poise and a solid content was 24.9%. The electrodeposition coating was carried out at 150 V (maximum electric current at that time was 1.2 A.) for 60 seconds by using the obtained composition. Then the coated article was dipped in N-methyl-2-pyrrolidone for a short period of time. The obtained coating baked in the same manner as in EXAMPLE 3 was smooth and free of pin hole. Also adhesivity to substrate was good.

EXAMPLE 5

Electrodeposition coating was carried out in the same manner as in EXAMPLE 3 by using the composition for electrodeposition coating, which was prepared in EXAMPLE 3, and triethylene glycol was sprayed uniformly with a sprayer over the coated surface, followed by baking in the same manner as in EXAMPLE 3. The surface of the obtained coating film was smooth and there was no pin hole. Also adhesivity to substrate was good.

COMPARATIVE EXAMPLE 2

Immediately after electrodeposition coating carried out in the same manner as in EXAMPLE 3, the coating film was subjected to baking. The surface of the coating film was in the granular form as if it was covered with sands, and there was no continuous surface. The coating film in the granular form was peeled off easily when scrubbed lightly with nail.

EXAMPLE 6

The steps of EXAMPLE 1 were repeated except that a solid content was adjusted to 40% by weight, to give a water soluble composition for electrodeposition. In the meantime, there was prepared, by emulsion polymerization, a polytetrafluoroethylene dispersion having a diameter of 0.2 to 0.4 $\mu$m, a solid content of 60% by weight, a viscosity of 2.5 poises (measured at 25° C.), pH of 10 and a molecular weight of 2,500,000 to 5,000,000.

Then 100 parts by weight of the obtained water soluble composition for electrodeposition, 100 parts by weight of the polytetrafluoroethylene dispersion and 800 parts by weight of water were mixed to give an electrodeposition agent.

The electrodeposition coating was carried out by using the apparatus shown in FIG. 1. By using a 5 cm× 10 cm stainless sheet (SUS 304, thickness:1.5 mm) as a cathode 1 in FIG. 1 and a 2.5 cm×10 cm aluminum sheet (thickness:1.5 mm) as an anode 4, the electrodeposition coating was carried out for 90 seconds at 100 V with a direct power source 2. As a solution 3 for electrodeposition coating in FIG. 1, there was used the electrodeposition coating agent of this EXAMPLE. The thus coated aluminum sheet was washed with water, dried at 70 °to 85° C. in infrared ray atmosphere for 15 minutes, and then baked at 230° C. for 30 minutes.

The surface of the aluminum sheet after baking was smooth, and there was no pin hole. The cross cut test was carried out in the same manner as in EXAMPLE 1, and as a result, there was no peeling and adhesivity was very good. Also a pencil hardness test (JIS K 6894) was carried out, and a coefficient of friction (Bauden-Revens method, 1.0 kg load, rate: 0.23 cm/sec, steel ball: 8 mm $\phi$) was measured. The results are shown in TABLE 1.

EXAMPLES 7 AND 8

The steps of electrodeposition coating of EXAMPLE 6 were repeated by using the electrodeposition coating agent except that the solid content and amount of the water soluble composition for electrodeposition, the solid content and amount of the polytetrafluoroethylene dispersion and the amount of water were changed as shown in TABLE 1. The results evaluated in the same manner as in EXAMPLE 6 are shown in TABLE 1.

TABLE 1

|  | Ex. 6 | Ex. 7 | Ex. 8 |
|---|---|---|---|
| Electrodeposition coating agent | | | |
| Water soluble composition (part by weight) | 100(40) | 150(60) | 125(50) |
| Dispersion (part by weight) | 100(60) | 67(40) | 83(50) |
| Water (part by weight) | 800 | 783 | 792 |
| Characteristics of coating | | | |
| Pencil hardness | 3H | 2H | F |
| Coefficient of friction | 0.06 | 0.05 | 0.04 |
| Cross cut test | 100/100 | 100/100 | 100/100 |

Figures in the parentheses show % by weight of solid.

The effects of the present inventions are as mentioned below.

(1) The first one of the present invention relates to an electrodeposition coating method in which in electrodeposition coating of a water soluble polyimide composition of a polyimide precursor which is obtained from 1,2,3,4-butanetetracarboxylic acid or its imide-forming derivative and a diamine and has a percentage of residual acid value of 30 to 3%, there is previously added a water soluble solvent selected from the group consisting of an alcoholic solvent, N-methyl-2-pyrrolidone, dimethylformamide and dimethylacetamide to the above-mentioned water soluble composition. According to the method, since the obtained composition is water soluble, it becomes possible to carry out the electrodeposition coating, and also since the above-mentioned specific solvent functions like a plasticizer, it is possible to obtain a continuous coating film and to form a uniform baked coating film excellent in adhesivity to substrate and in toughness. Thus, there can be provided a practicably applicable electrodeposition coating method.

(2) In the electrodeposition coating method of the above (1) when employing a preferred embodiment wherein the content of the water soluble solvent selected from the group consisting of an alcoholic solvent, N-methyl-2-pyrrolidone, dimethylformamide and dimethylacetamide is not less than 20% by weight on the basis of the sum of the water soluble composition of the polyimide precursor and the water soluble solvent, there can be provided a practicably applicable electrodeposition coating method by using the water soluble polyimide composition. According to the method, it is possible to achieve a continuous coated film more easily and to form a uniform baked coating film excellent in adhesivity to substrate and in toughness.

(3) Also in the electrodeposition coating method of the above (1), by adding a dispersion containing a fluorine-containing resin to the water soluble composition of the polyimide precursor, there can be provided an electrodeposition coating method, wherein a more uniform coating film can be formed on a sharp-pointed edge portion of an article to be coated without making a coating film thickness thinner, and also the coating film can be excellent in thermal resistance, non-tackifying property, and chemical resistance such as rust inhibiting property and corrosion protecting property and have a low friction coefficient (lubricity).

(4) In the electrodeposition coating method of the above (3), the above-mentioned functions can be exhibited sufficiently without lowering toughness of the coating film by taking a solid weight ratio of the water soluble composition of the polyimide precursor to the dispersion containing the fluorine-containing resin as 5:95 to 95:5, more preferably 40:60 to 60:40.

(5) There can be provided an electrodeposition coating method, wherein by using a dispersion containing polytetrafluoroethylene as the dispersion of the above (3) containing the fluorine-containing resin, it becomes possible to easily obtain a dispersion containing a fluorine-containing resin, and also, by using such dispersion, it is possible to form a coating film being further excellent in thermal resistance and having a low friction coefficient (lubricity).

(6) The present invention relates to an electrodeposition coating method, wherein after electrodeposition coating of a water soluble composition of a polyimide precursor which is obtained from 1,2,3,4-butanetetracarboxylic acid or its imide-forming derivative and a diamine and has a percentage of residual acid value of 30 to 3%, on the electrodeposition-coated surface is coated a water soluble solvent selected from an alcoholic solvent, N-methyl-2-pyrrolidone, dimethylformamide and dimethylacetamide or its aqueous solution. According to the method, since the above-mentioned specific water soluble solvent permeates the coating of the electrodeposition-coated surface and functions like a plasticizer, it is possible to obtain a continuous coating film and to form a uniform baked coating film being excellent in adhesivity to substrate and in toughness.

(7) Also in the electrodeposition coating method of the above (6), by adding a dispersion containing a fluorine-containing resin to the water soluble composition of the polyimide precursor, there can be provided an electrodeposition coating method, wherein a more uniform coating film can be formed on a sharp-pointed edge portion of an article to be coated without making a coating film thickness thinner, and also the coating film can be excellent in thermal resistance, non-tackifying property, and chemical resistance such as rust inhibiting property and corrosion protecting property and have a low friction coefficient (lubricity).

(8) In the electrodeposition coating method of the above (7), the above-mentioned functions can be exhibited sufficiently without lowering toughness of the coating film by taking a solid weight ratio of the water soluble composition of the polyimide precursor to the dispersion containing the fluorine-containing resin as 5:95 to 95:5, more preferably 40:60 to 60:40.

(9) There can be provided an electrodeposition coating method, wherein by using a dispersion containing polytetrafluoroethylene as the dispersion of the above (7) containing the fluorine-containing resin, it becomes possible to easily obtain a dispersion containing a fluorine-containing resin, and also, by using such dispersion, it is possible to form a coating being further excellent in thermal resistance and having a low friction coefficient (lubricity).

(10) The present invention relates to an electrodeposition coating agent which is prepared by adding a water soluble solvent selected from the group consisting of an alcoholic solvent, N-methyl-2-pyrrolidone, dimethylformamide and dimethylacetamide to a water soluble composition of a polyimide precursor which is obtained from 1,2,3,4-butanetetracarboxylic acid or its imide-forming derivative and a diamine and has a percentage of residual acid value of 30 to 3%, and since a content of the above-mentioned water soluble solvent is taken as not less than 20% by weight on the basis of the sum of the water soluble solvent and the water soluble composition of the polyimide precursor, it is possible to carry out the electrodeposition coating, and also, since at electrodeposition coating, the above-mentioned specific solvent functions like a plasticizer, it is possible to obtain a continuous coating film and to form a uniform baked coating film excellent in adhesivity to substrate and in toughness.

(11) Also by adding a dispersion containing a fluorine-containing resin to the water soluble composition of the polyimide precursor of the above (10), there can be obtained an electrodeposition coating agent which makes it possible to form a more uniform coating film on a sharp-pointed edge portion of an article to be coated without making a coating film thickness thinner, and also to obtain a coating film being excellent in thermal resistance, non-tackifying property, and chemical resistance such as rust inhibiting property and corrosion protecting property and having a low friction coefficient (lubricity).

(12) In the electrodeposition coating agent of the above (11), there can be obtained an electrodeposition coating agent which can exhibit the above-mentioned functions sufficiently without lowering toughness of a coating film by taking a solid weight ratio of the water soluble composition of the polyimide precursor to the dispersion containing the fluorine-containing resin as 5:95 to 95:5, more preferably 40:60 to 60:40.

(13) There can be provided an electrodeposition coating agent, wherein by using a dispersion containing polytetrafluoroethylene as the dispersion of the above (11) containing the fluorine-containing resin, it becomes possible to easily obtain a dispersion containing a fluorine-containing resin, and also, by using such dispersion, it is possible to form a coating film being further excellent in thermal resistance and low friction property (lubricity).

INDUSTRIAL APPLICABILITY

There can be provided an electrodeposition coating method and an electrodeposition coating agent, which are practicable for electrodeposition of a water soluble composition which is capable of forming a uniform baked coating film having a continuous surface and being excellent in adhesivity to substrate and in toughness.

We claim:

1. A coating method comprising preparing a polyimide precursor and then coating the polyimide precursor on a substrate:
    the polyimide precursor is prepared by forming a water soluble coating composition of 1,2,3,4-butanetetracarboxylic acid or its imide forming derivative, a diamine and a water soluble solvent selected from the group consisting of an alcoholic solvent, N-methyl-2-pyrrolidone, dimethylformamide and dimethylacetamide for initiating a reaction between the 1,2,3,4-butanetetracarboxylic acid or its imide forming derivative and the diamine, and terminating the reaction when the water soluble coating composition has a residual acid value of 3 to 30%, and
    electrodepositing the polyimide precursor onto the substrate from the water soluble coating composition.

2. The electrodeposition coating method of claim 1, wherein a content of the water soluble solvent selected from the group consisting of an alcoholic solvent, N-methyl-2-pyrrolidone, dimethylformamide and dimethylacetamide is not less than 20% by weight on the basis of the sum of said water soluble composition of the polyimide precursor and said water soluble solvent.

3. The electrodeposition coating method of claim 1, wherein a dispersion containing a fluorine-containing resin is added to the water soluble composition of the polyimide precursor.

4. The electrodeposition coating method of claim 3, wherein a solid weight ratio of the water soluble composition of the polyimide precursor to the dispersion containing the fluorine-containing resin is 5:95 to 95:5.

5. The electrodeposition coating method of claim 3, wherein the dispersion containing the fluorine-containing resin is a dispersion of polytetrafluoroethylene.

6. A coating method comprising preparing a polyimide precursor and then coating the polyimide precursor on a substrate, wherein:
    the polyimide precursor is prepared by forming a water soluble coating composition of 1,2,3,4-butanetetracarboxylic acid or its imide-forming derivative and a diamine and a water soluble solvent selected from the group consisting of an alcoholic solvent, N-methyl-2-pyrrolidone, dimethylformamide and dimethylacetamide or its aqueous solution for initiating a reaction between the 1,2,3,4-butanetetracarboxylic acid or its imide-forming derivative and a diamine, and terminating the reaction when the water soluble coating composition has a residual acid value of 3 to 30%, and
    electroplating the polyimide precursor onto the substrate from the water soluble coating composition.

7. The electrodeposition coating method of claim 6, wherein a dispersion containing a fluorine-containing resin is added to said water soluble composition of the polyimide precursor.

8. The electrodeposition coating method of claim 7, wherein a solid weight ratio of the water soluble composition of the polyimide precursor to the dispersion containing the fluorine-containing resin is 5:95 to 95:5.

9. The electrodeposition coating method of claim 7, wherein the dispersion containing the fluorine-containing resin is a dispersion of polytetrafluoroethylene.

10. A coating method comprising preparing a coating agent and then coating the coating agent onto a substrate, wherein:
    the coating agent is prepared by adding a water soluble solvent selected from the group consisting of an alcoholic solvent, N-methyl-2-pyrrolidone, dimethylformamide and dimethylacetamide to a water soluble composition of a polyimide precursor which is prepared by initiating a reaction between 1,2,3,4-butanetetracarboxylic acid or its imide-forming derivative and a diamine and terminating the reaction when the water soluble composition has a percentage of residual acid value of 30 to 3%, and a content of said water soluble solvent is not less than 20% by weight on the basis of the sum of said water soluble solvent and said water soluble composition of the polyimide precursor, and
    electroplating the coating agent onto the substrate.

11. The electrodeposition coating agent of claim 10, wherein a dispersion containing a fluorine-containing resin is added to said water soluble composition of the polyimide precursor.

12. The electrodeposition coating agent of claim 11, wherein a solid weight ratio of said water soluble composition of the polyimide precursor to said dispersion containing the fluorine-containing resin is 5:95 to 95:5.

13. The electrodeposition coating agent of claim 11, wherein the dispersion containing the fluorine-containing resin is a dispersion of polytetrafluoroethylene.

14. The coating method of claim 10, wherein the imide-forming derivative is selected from the group consisting of anhydride, ester, and amide derivatives.

15. The electrodeposition coating method of claim 1, wherein the alcoholic solvent wherein the solvent is selected from the group consisting of:

R—OH (I)

wherein R is a monovalent residual group of an aliphatic or alicyclic compound having 3 to 8 carbon atoms;

HO—R¹—OH (II)

wherein $R^1$ is a divalent residual group of an aliphatic or alicyclic compound having 3 to 8 carbon atoms;

a divalent residual group represented by the formula:

$$-(\underset{\underset{R^2}{|}}{C}HCH_2O)_n-\underset{\underset{R^2}{|}}{C}HCH_2- \quad (III)$$

wherein n is 0 or an integer of 1 to 5, and $R^2$ is hydrogen or methyl;

$$R^3O-(CH_2CH_2O)_m-R^4 \quad (IV)$$

wherein m is an integer of 1 to 3, $R^3$ is a lower alkyl group having 1 to 4 carbon atoms, $R^4$ is hydrogen or —OOCCH₃ or both $R^3$ and $R^4$ are methyl; and $$R^5\!\!\begin{array}{c}\diagup OH\\\!\!\leftarrow OH\\\diagdown OH\end{array} \quad (V)$$

wherein $R^5$ is a residual group of glycerin or trimethylol propane.

16. The electrodeposition coating method of claim 1, wherein the imide-forming derivative is selected from the group consisting of anhydride, ester and amide derivatives.

17. The coating method of claim 6, wherein the alcoholic solvent is selected from the group consisting of:

R—OH (I)

wherein R is a monovalent residual group of an aliphatic or alicyclic compound having 3 to 8 carbon atoms;

HO—R¹—OH (II)

wherein $R^1$ is a divalent residual group of an aliphatic or alicyclic compound having 3 to 8 carbon atoms;

a divalent residual group represented by the formula:

$$-(\underset{\underset{R^2}{|}}{C}HCH_2O)_n-\underset{\underset{R^2}{|}}{C}HCH_2- \quad (III)$$

wherein n is 0 or an integer of 1 to 5, and $R^2$ is hydrogen or methyl;

$$R^3O-(CH_2CH_2O)_m-R^4 \quad (IV)$$

wherein m is an integer of 1 to 3, $R^3$ is a lower alkyl group having 1 to 4 carbon atoms, $R^4$ is hydrogen or —OOCCH₃ or both $R^3$ and $R^4$ are methyl; and $$R^5\!\!\begin{array}{c}\diagup OH\\\!\!\leftarrow OH\\\diagdown OH\end{array} \quad (V)$$

wherein $R^5$ is a residual group of glycerin or trimethylol propane.

18. The coating method of claim 6, wherein the imide-forming derivative is selected from the group consisting of anhydride, ester and amide derivatives.

19. The coating method of claim 10, wherein the alcoholic solvent is selected from the group consisting of:

R—OH (I)

wherein R is a monovalent residual group of an aliphatic or alicyclic compound having 3 to 8 carbon atoms;

HO—R¹—OH (II)

wherein $R^1$ is a divalent residual group of an aliphatic or alicyclic compound having 3 to 8 carbon atoms;

a divalent residual group represented by the formula:

$$-(\underset{\underset{R^2}{|}}{C}HCH_2O)_n-\underset{\underset{R^2}{|}}{C}HCH_2- \quad (III)$$

wherein n is 0 or an integer of 1 to 5, and $R^2$ is hydrogen or methyl;

$$R^3O-(CH_2CH_2O)_m-R^4 \quad (IV)$$

wherein m is an integer of 1 to 3, $R^3$ is a lower alkyl group having 1 to 4 carbon atoms, $R^4$ is hydrogen or —OOCCH₃ or both $R^3$ and $R^4$ are methyl; and $$R^5\!\!\begin{array}{c}\diagup OH\\\!\!\leftarrow OH\\\diagdown OH\end{array} \quad (V)$$

wherein $R^5$ is a residual group of glycerin or trimethylol propane.

* * * * *